United States Patent

Okawa

[11] Patent Number: 4,705,425
[45] Date of Patent: Nov. 10, 1987

[54] PANEL COUPLER

[75] Inventor: Toshiya Okawa, Yokohama, Japan

[73] Assignee: Nifco Inc., Yokohama, Japan

[21] Appl. No.: 912,835

[22] Filed: Sep. 26, 1986

[30] Foreign Application Priority Data

Sep. 30, 1985 [JP] Japan .......................... 60-148218[U]

[51] Int. Cl.⁴ .......................... F16B 1/00; F16B 37/04
[52] U.S. Cl. .................................. 403/376; 403/406.1;
403/408.1; 411/174; 411/546
[58] Field of Search ............... 403/408.1, 409.1, 405.1,
403/365, 11, 353, 24, 225, 220, 361, 375, 376,
372, 397, 406.1, 390, 388; 411/174, 522-524,
546, 547, 544, 908

[56] References Cited

U.S. PATENT DOCUMENTS

| 3,038,194 | 6/1962 | Arenson | 403/372 |
| 4,240,184 | 12/1980 | Delhees et al. | 403/397 |
| 4,408,939 | 10/1983 | Graff et al. | 411/174 X |
| 4,440,535 | 3/1984 | Oehlke | 411/174 X |
| 4,617,775 | 10/1986 | Padrum | 403/397 |

FOREIGN PATENT DOCUMENTS

| 2489900 | 3/1982 | France | 403/408.1 |
| 2518195 | 6/1983 | France | 403/408.1 |

Primary Examiner—Andrew V. Kundrat
Assistant Examiner—Peter M. Cuomo
Attorney, Agent, or Firm—Trexler, Bushnell, Giangiorgi & Blackstone, Ltd.

[57] ABSTRACT

A panel coupler comprises a plastic molding having a hollow case-like spacer part open at least at one end and having aligned bolt insertion holes formed in top and bottom walls and a clip part united to the spacer part to be fitted on one of two panels, and a reinforcement metal ring fitted in the spacer part from the open end thereof and having a hole aligned with the insertion holes.

2 Claims, 6 Drawing Figures

PANEL COUPLER

FIELD OF THE INVENTION AND RELATED ART STATEMENT

This invention relates to a panel coupler and, more particularly, to a panel coupler for coupling together two facing panels spaced apart a predetermined distance, by passing a bolt through the facing panels and tightening a nut on the bolt.

Heretofore, various panel couplers for coupling together two panels have been proposed. An example of this type of panel coupler is shown in FIGS. 1 and 2. The illustrated panel coupler 1 is produced by injection molding from a plastic material. It has two planar portions 2 facing each other and coupled together by a U-shaped portion 3. The two planar portions 2 have aligned mounting holes 4, through which a bolt B is passed. A cylindrical portion 5 extends outwardly from the edge of the mounting hole 4 of one planar portion 2. A reinforcement metal ring 6 is inserted in the cylindrical portion 5 when the panel coupler is molded.

As this prior art panel coupler is molded with the metal ring as an insert, however, it is necessary to use a high-precision mold. In addition, it is difficult to automate the molding process, and the product has to be molded semi-automatically. Therefore, the cost of molding is high.

Further, resin is liable to enter the inside of the metal ring 6 from the open end thereof at the time of the molding, so that defective products are liable to result. Reference symbols P in the drawing designate panels to be joined together by the panel coupler.

OBJECT AND SUMMARY OF THE INVENTION

An object of the invention is to provide a panel coupler which can be readily manufactured by an automatic molding process.

To attain the above object of the invention, there is provided a panel coupler which comprises a plastic molding having a hollow case-like spacer partially open at least at one end and having aligned bolt insertion holes formed in top and bottom walls and a clip part united to the spacer part to be fitted on at least one of the two panels, and a reinforcement metal ring fitted in the spacer part from the open end thereof and having a hole aligned to the mounting holes.

According to the invention, after the plastic molding has been formed using a molding machine, the metal ring is fitted in the spacer part of the molding from an open end, whereby the molding and metal ring are assembled together such that the mounting holes of the former and the hole of the latter are aligned.

After panel coupler has been assembled, the panels to be coupled together are formed with bolt insertion holes, and the spacer is inserted between the two panels held spaced apart such that the mounting holes of the spacer part and the holes of the panels are aligned. At this time, the clip part of the panel coupler is fitted on one of the two panels. A bolt is then passed through the mounting holes of the spacer part and the holes of the panels, and a nut is tightened on the projecting portion of the bolt. In this way, the panels are coupled together such that they are spaced apart vertically a predetermined distance by the spacer part.

Since according to the invention the metal ring is fitted in the spacer part after the plastic molding has been formed, the injection molding of the plastic molding can be carried out easily and automatically.

BRIEF DESCRIPTION OF THE DRAWINGS

The above and other objects and features of the invention will become more apparent from the following detailed description with reference to the accompanying drawings, in which.

DETAILED DESCRIPTION OF THE PREFERRED EMBODIMENT

Figure 1:
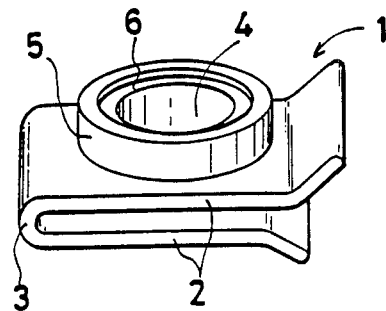
FIG. 1 is a perspective view showing a prior art panel coupler.
Figure 2:
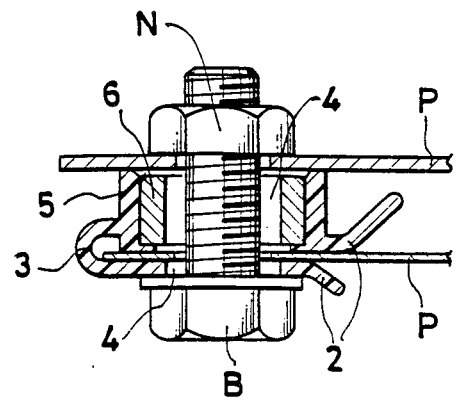
FIG. 2 is a sectional view showing the panel coupler of FIG. 1 in a state coupling together two panels.
Figure 3:
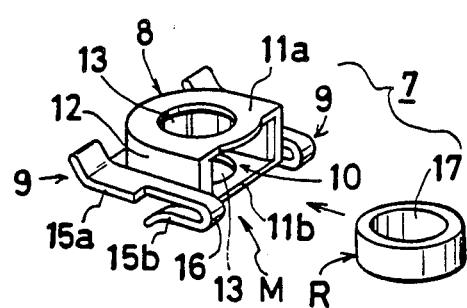
FIG. 3 is an exploded perspective view showing an embodiment of the panel coupler according to the invention.
Figure 4:
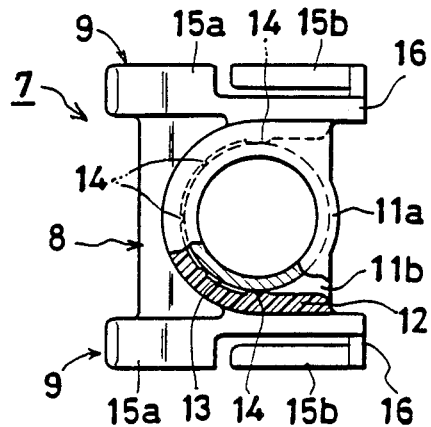
FIG. 4 is a plan view showing the panel coupler of FIG. 3.
Figure 5:
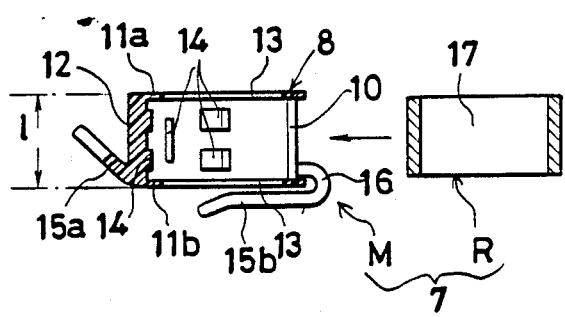
FIG. 5 is a longitudinal sectional view showing the coupler of FIG. 3 in a diassembled state.

FIGS. 3 to 6 illustrate an embodiment of the panel coupler according to the invention. The panel coupler 7 comprises a plastic molding M and a metal ring R. The molding M has a spacer part 8 for accommodating a metal ring R and a clip part 9 to be fitted on at least one of two panels P.

The spacer part 8 is case-like and open at one end 10. It has top and bottom walls 11a and 11b vertically spaced apart and facing each other and a side wall 12 extending along the edge of and connecting the top and bottom walls 11a and 11b are substantially D-shaped planar portions and have substantially central aligned circular bolt insertion holes 13. The side wall 12 has a portion having an arcuate sectional profile. The inner surface of the arcuate portion is provided with a plurality of positioning ribs 14 projecting inwardly to make contact with the outer periphery of the metal ring R.

In the illustrated embodiment, the clip part 9 consists of two portions each united to and extending along each side of the spacer part 8. Each portion has upper and lower strip-like portions 15a and 15b joined together by a U-shaped portion 16. The distance between the two strip-like portions 15a and 15b is smaller than the thickness of the plate P to be clamped so that the panel P can be elastically clamped in the gap between the two strip-like portions 15a and 15b by the elasticity of the U-shaped portion 16. Of the two strip-like portions 15a and 15b, the upper one 15a is longer than the lower one 15b. the two strip-like portions 15a and 15b have their free end portions bent upwardly and downwardly, respectively, to facilitate the insertion of the panel P.

The metal ring R has an outer diameter such that it can be fitted in the spacer part 8, and its hole 17 has a diameter slightly greater than that of the mounting hole 13 of the spacer part 8. The axial dimension of the metal ring R is set to be substantially equal to the gap between the top and bottom walls 11a and 11b of the spacer part 8.

Thus, after the molding M has been obtained from a plastic material, the metal ring R may be fitted sidewise into the spacer part 8 from the open end 10 thereof. When the metal ring R is fitted, it is positioned substantially in a central position with its outer periphery in contact with the ribs 14 projecting from the inner surface of the spacer part 8. Thus, the metal ring R is accommodated in the spacer part 8 such that its hole 7 is aligned with the mounting holes 13 of the spacer part 8.

Figure 6:
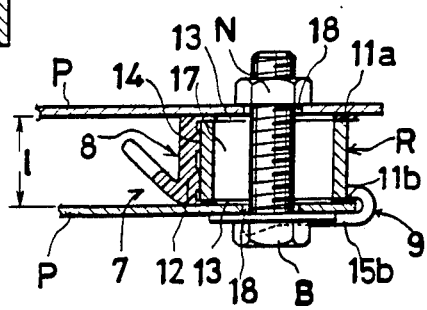
FIG. 6 is a sectional view showing the panel coupler of FIG. 3 in a state coupling together two panels.

Now, the use of the panel coupler having the above construction will be described with reference to FIG. 6. Two panels P are held spaced apart such that their holes 18 face each other. Then, the spacer part 8 is inserted in the gap between the two panels P facing each other such that the mounting holes 13 of the spacer part 8 are aligned with the mounting holes 18 of the panels P.

At this time, the clip part 9 is fitted on an end portion of one of the panels P, so that the two strip-like portions 15a and 15b are outwardly pushed apart. The panel P thus is clamped in the gap between the two strip-like portions 15a and 15b. The spacer part 8 is thus fitted on the panel P with its mounting holes 13 aligned with the hole 18 of the panel P. In this state, a bolt B is passed through the holes 18 and mounting holes 13, and a nut N is tightened on the projecting end portion of the bolt B, whereby the two panels P are secured to each other.

The two panels P are coupled together such that they are spaced apart vertically by a distance equal to the vertical dimension of the spacer part 8.

Further, the clamping force provided by the bolt B and nut N acts on the metal ring R in the axial direction thereof via the top and bottom walls 11a and 11b of the spacer part 8. The two panels P thus can be held parallel at all time without flexing of the top and bottom walls 11a and 11b of the spacer part 8.

Further, only the plastic top and bottom walls 11a and 11b are in contact with the opposed surfaces of the two panels, and the metal ring R is not in direct contact with the panels P, so that the painted or plated surface of the two panels P is not damaged.

It is possible to couple the two panels by clamping the panel coupler 7 to one of the panels P and then setting the other panel P such that the spacer part 8 is sandwiched between the two panels P.

The clip part 9 may be of any type so long as it can be fitted on at least one of the two panels P. For example, it is possible to utilize a clip of anchor type or canoe type.

As has been described in the foregoing, according to the invention the panel coupler is manufactured by forming a molding having a spacer part and a clip part and then fitting the metal ring in the spacer part. Thus, the molding can be produced inexpensively in an automatic process. Further, since the spacer part serves as a case to accommodate the metal ring, the molding and metal ring can be easily assembled together without need of any particular securement means.

Further, since the metal ring is accommodated in the plastic spacer part, it will not come in direct contact with the opposed surfaces of the panels, so that the painted or plated surface of the two panels will not be scarred or scratched by the metal ring, thus eliminating the danger of rusting.

What is claimed is:

1. A panel coupler for coupling together two facing panels at a predetermined distance from each other by passing a bolt throught the panels and tightening a nut on the bolt, comprising:

a plastic molding having cavity within a case-like spacer part, said cavity having a radially arranged opening and having aligned bolt insertion holes formed in top and bottom walls of the spacer part, and a clip part united to said spacer part to be fitted on one of said two panels; and a reinforcement metal ring fitted into said cavity through said opening, said ring having a bolt passageway aligned with said insertion holes.

2. The coupler according to claim 1 wherein said ring is retained by frictionally fitted engagement within said spacer, said opening being oriented in a plane generally perpendicular to said insertion holes.

* * * * *